R. P. DE VAULT.
INTERMITTENT GEARING FOR MOTION PICTURE APPARATUS.
APPLICATION FILED MAY 19, 1919.
1,355,543.
Patented Oct. 12, 1920.
2 SHEETS—SHEET 1.
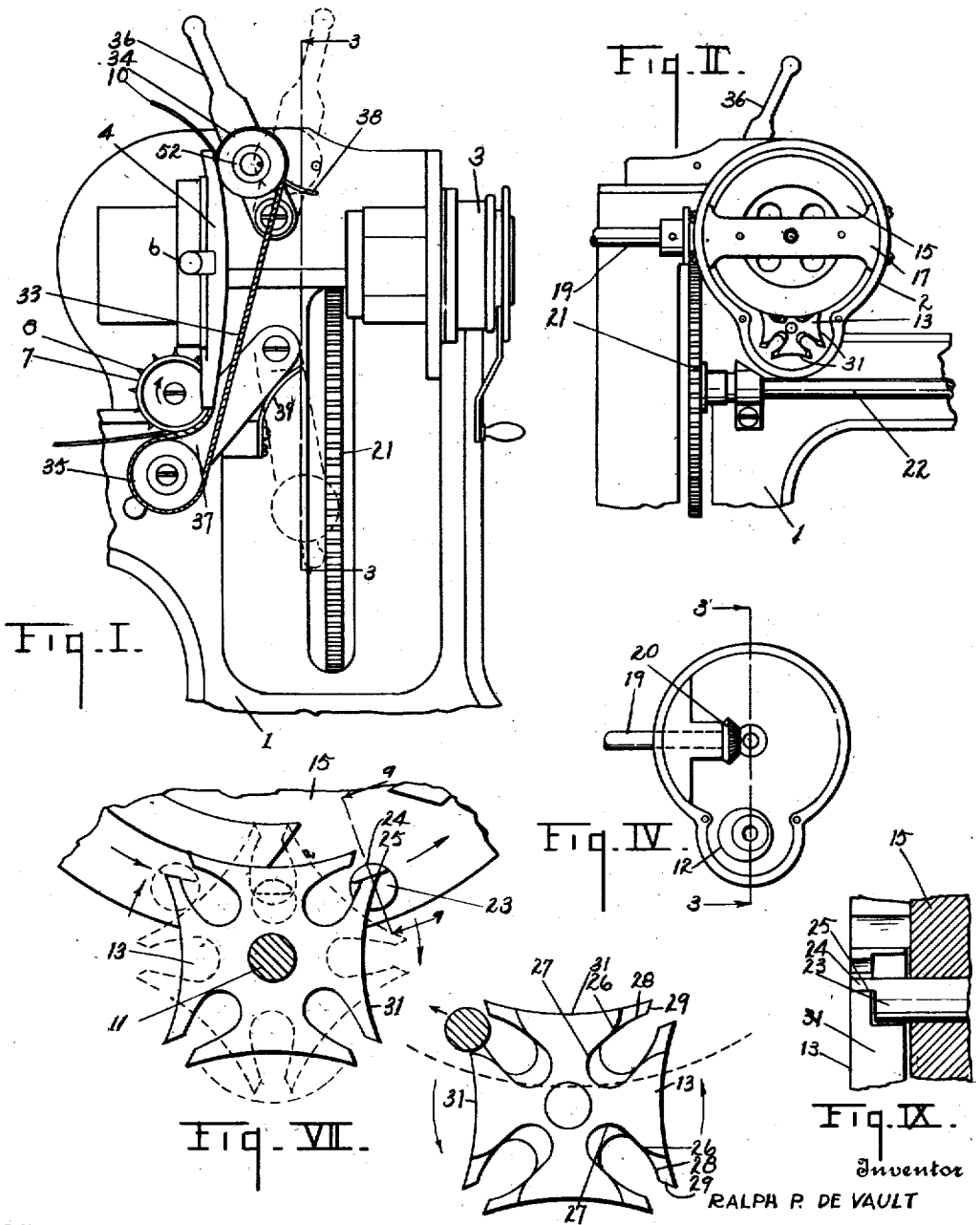
RALPH P. DE VAULT

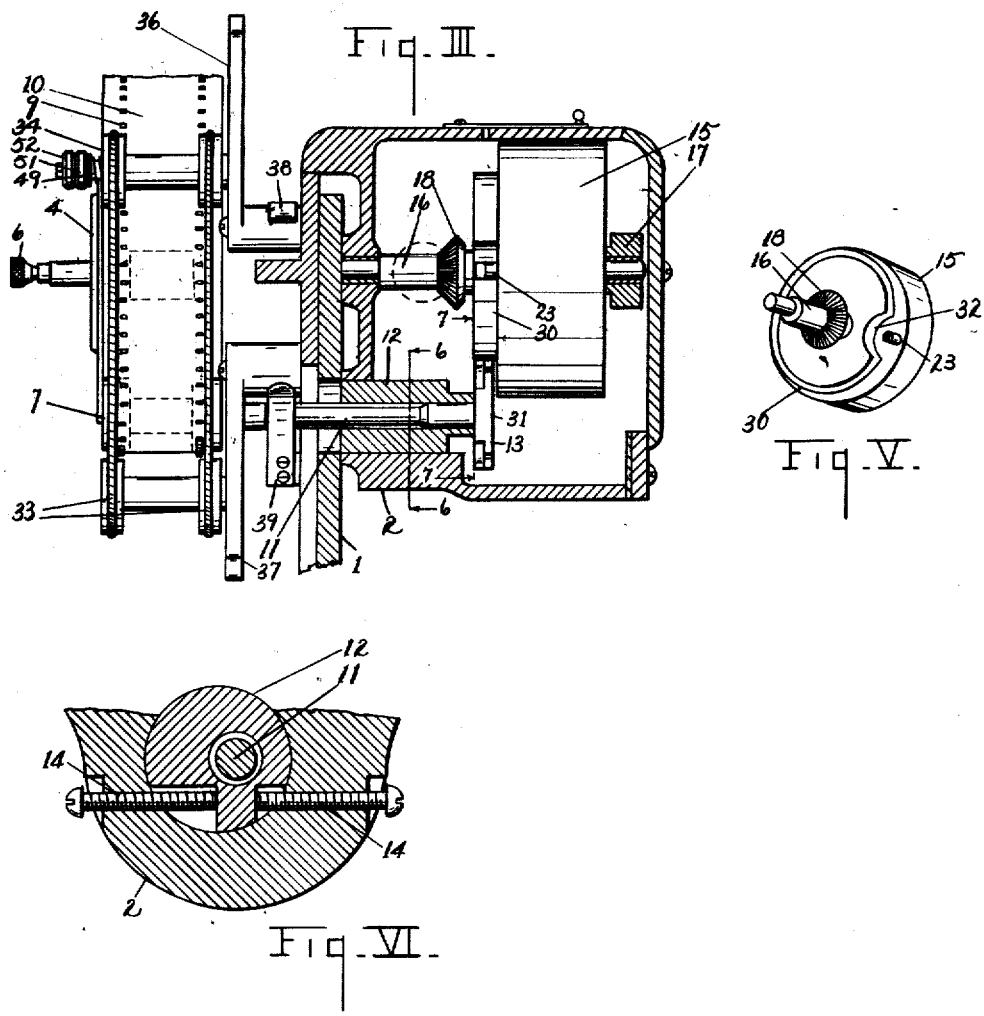

UNITED STATES PATENT OFFICE.

RALPH P. DE VAULT, OF BATTLE CREEK, MICHIGAN.

INTERMITTENT GEARING FOR MOTION-PICTURE APPARATUS.

1,355,543.   Specification of Letters Patent.   Patented Oct. 12, 1920.

Application filed May 19, 1919. Serial No. 298,013.

*To all whom it may concern:*

Be it known that I, RALPH P. DE VAULT, a citizen of the United States, residing at Battle Creek, county of Calhoun, State of Michigan, have invented certain new and useful Improvements in Intermittent Gearing for Motion-Picture Apparatus, of which the following is a specification.

This invention relates to improvements in intermittent gearing for motion picture apparatus.

In a motion picture apparatus of the intermittently moving film class, it is customary to cut off the light during the movement of the film and this interruption of the light is the cause of the objectionable flicker.

To reduce the flicker, it is customary to provide the shutter with interrupting portions causing further interruptions of the light while the film is at rest, and while this reduces the pronounced flicker, it also reduces the illumination upon the screen, the average machine allowing about 50% of the light minus the density of the film to reach the screen.

The main objects of this invention are:

First, to provide in a motion picture apparatus an improved film driving means whereby the time of changing pictures is reduced, reducing the period of darkness so it is practically imperceptible and therefore it is not necessary to introduce other periods of darkness or interruptions.

Second, to provide an improved motion picture apparatus utilizing a large percentage of the illumination.

Third, in a motion picture apparatus an improved film driving means, having these advantages which makes but little noise, and drives the film with but little wear thereon, and is very economical and durable in structure.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawings forming a part of this specification, in which:

Figure I is a side elevation of a structure embodying the features of my invention, parts being mainly shown conventionally and parts broken away.

Fig. II is a detail view looking from the right of Fig. III and the rear side of Fig. I, with the cover or side plate of the gear box removed.

Fig. III is a detail view mainly in vertical section on a line corresponding to line 3—3 of Figs. I and IV.

Fig. IV is a detail view of parts shown in Fig. II, the driving gears for the film sprocket being removed.

Fig. V is a front perspective view of the Geneva stop movement driving member.

Fig. VI is an enlarged detail section on a line corresponding to line 6—6 of Fig. III, showing the adjustable bearing for the spindle of the film sprocket which carries the driven Geneva stop member.

Fig. VII is an enlarged detail view, partially in section, on a line corresponding to line 7—7 of Fig. III, showing further details of the film driving means.

Fig. VIII is a side view showing the rear or inner face of the star wheel, of the film driving means.

Fig. IX is a detail section on a line corresponding to line 9—9 of Fig. VII.

In the drawing, similar reference characters refer to similar parts throughout the several views, and the sectional views are taken looking in the direction of the little arrows at the ends of the section lines.

Referring to the drawing, 1 represents the frame of a moving picture machine and 2 the gear box or housing for the film driving gearing and 3 the lens box. The details of the shutter are not illustrated as they form no part of this invention. The film gate 4 is secured at the rear of the lens box by means of the set screw 6. The film casing and support are not illustrated, as such parts form no part of this invention.

The film sprocket 7 is disposed at the rear end of the aperture gate and is provided with teeth 8 which engage the perforations 9 of the film 10, which is a well-known type. The spindle 11 of the film sprocket is supported in bearing 12 mounted in the gear box 2. The spindle is disposed eccentrically in its bearing which is rotatably adjustable in its support, thereby providing adjustment for the driven star wheel 13 of the intermittent driving means for the film sprocket. The bearing 12 is adjusted and retained in its adjusted positions by means of the screws 14, (see Fig. VI).

The driving member 15 of the Geneva movement is provided with a shaft 16, one end of which has a bearing in the inner side of the gear box 2, (see Fig. III), and the other in a bridge piece 17 extending across the gear.

The driving member 15 is designed in the structure illustrated to serve as a balance wheel. The shaft 16 is provided with a beveled gear 18 driven from the shaft 19 having beveled gear 20 thereon. This shaft 19 is driven from the large gear 21 on the power shaft 22. The means for driving this shaft are not shown, it being ordinarily provided with a crank.

The driving gear 15 is provided with a driving pin 23 having a cylindrical body portion and a segmental extension 24, the chord side 25 of which provides a flat inner face.

The star wheel, or driven member 13, is provided with radially disposed recesses 26 having inner portions 27 with which the body of the driving pin coacts to actuate the wheel and the outer portions 28 of a width less than the diameter of the body portion of said pin, adapted to receive and coact with said pin extension. These outer portions of the slots have outwardly and diverging flat surfaces 29 at the entrance of the slots with which the flat face of said pin extension coacts when the pin passes into and from the slots. See Fig. VII. During this period of movement, the pin acts as a stop member, preventing the movement of the star wheel, or stopping its movement, thereby preventing its striking the locking cam 30 of the driving gear and eliminating noise. The star wheel is provided with concave surfaces 31 between its slots with which the cam 30 of the gear 15 coacts to hold the star wheel against movement, the cam being recessed at 32 at the pin 23 to permit rotation of the star wheel.

It will be noted (see Fig. VIII) that the portion of the slot with which the body portion of the actuating pin engages is substantially shorter than the slot, and that this portion of the slot extends well toward the axis of the wheel, so that in operation the period of actuation is very short, thus reducing the time of shifting or actuation of the film. The time of actuation in the structure illustrated is about $\frac{1}{12}$ of the time of complete rotation of the driving member. I thus reduce the period of operation to such an extent that the period of darkness, or interruption of the light, is such as to be unobjectionable, and therefore it is not necessary to provide for, or introduce other periods of darkness, or interruption, while the film is at rest. This greatly increases the efficiency of the light, and the apparatus illustrated utilizes about 90% of the light, which result is greatly in excess of what has heretofore been attained; and further, I accomplish this rapid movement without an objectionable noise.

By adjusting the bearings of the spindle through means shown in Fig. VI, and heretofore described, the star wheel is brought into its proper relation to its driving member for adjustment in assembling or to take up wear.

To hold the film steady and prevent fluttering during its rapid movement, I provide a pair of resilient belts 33 formed of coiled springs. These belts are supported by pulleys 34 and 35 disposed at the ends of the gate, the lower pulley 35 being disposed below the film driving sprocket. The supports 36 and 37 for these pulleys are pivoted so as to be swung back away from the film, their released position being indicated by dotted line. The springs 38 and 39 hold the supports in their operative position. These belts are supported by these pulleys so that the rear reaches of the belts yieldingly hold the film against the aperture gate and against the film sprocket as the film travels across the same. The belts being driven by their engagement with the film sprocket, their speed is that of the film, so that there is no surface friction of the belts on the film, and the films are fed so that the wear of the sprockets thereon is nominal, thus increasing the life of the film.

The upper pulleys 34 are provided with a friction means to prevent the overrunning of the belts, consisting of the spring 49 which presses the friction disk 50 against the pulley. The adjusting and lock nuts 51 and 52 respectively regulate the friction.

I have illustrated and described my improvement in these two embodiments in order to show the general adaptability thereof. I have not attempted to illustrate or describe other adaptations or embodiments, as I believe the disclosure made will enable those skilled in the art to which my invention relates to embody or adapt the same as may be desired.

Having thus described my invention, what I claim as new and desire to secure by Letters Patent is:

1. In a structure of the class described, the combination with a film sprocket, of a driving means therefor comprising a driving wheel provided with a driving pin having a cylindrical body portion and a segmental extension provided with a flat inner face, and a coacting driven wheel provided with radially disposed slots having inner portions with which the body portion of said driving pin coacts to actuate the wheel and outer portions of a width less than the diameter of the body portion of the said pin coacting with said pin extension, said outer portions of said slots having flat outwardly diverging surfaces at the entrance thereof with which the flat face of said pin extension coacts as the pin passes into and from the slots, said driven wheel having concave surfaces between its said slots, said driving wheel having a cylindrical cam coacting with said concave surfaces of said driven wheel with a recess therein at the pin, permitting the actuation of the driven wheel by the pin.

2. In a structure of the class described, the combination with a film sprocket, of a driving means therefor comprising a driving wheel provided with a driving pin having a cylindrical body portion and a segmental extension, and a coacting driven wheel provided with radially disposed slots having inner portions with which the body portion of said driving pin coacts to actuate the wheel and outer portions of a width less than the diameter of the body portion of the said pin coacting with said pin extension, said outer portions of said slots having surfaces with which said pin extension coacts as the pin passes into and from the slots, said driven wheel having concave surfaces between its said slots, said driving wheel having a cylindrical cam coacting with said concave surfaces of said driven wheel with a recess therein at the pin permitting the actuation of the driven wheel by the pin.

3. In a structure of the class described, the combination with a film sprocket, of a driving means therefor comprising a driving wheel provided with driving pin having a cylindical body portion and an extension, and a coacting driven wheel provided with radially disposed slots having inner portions with which the body portion of said driving pin coacts to actuate the wheel and outer portions with which said pin extension coacts having surfaces with which the pin extension engages while the driven wheel is at rest as the body of the pin passes into and from the slots, said driven wheel having concave surfaces between its said slots, said driving wheel having a cylindrical cam coacting with said concave surfaces of said driven wheel with a recess therein at the pin, permitting the actuation of the driven wheel by the pin.

4. The combination of a driving wheel provided with driving pin having a cylindrical body portion and a segmental extension provided with a flat, inner face, and a coacting driven wheel provided with radial slots having inner portions with which the body portion of said driving pin coacts to actuate the wheel and outer portions of a width less than the diameter of the body portion of the said pin coacting with said pin extension, said outer portions of said slots having flat outwardly diverging surfaces at the entrance thereof with which the flat face of said pin extension coacts as the pin passes into and from the slots, said driven wheel having concave surfaces between its said slots, said driving wheel having a cylindrical cam coacting with said concave surfaces of said driven wheel with a recess therein at the pin permitting the actuation of the driven wheel by the pin.

5. The combination of a driving wheel provided with driving pin having a cylindrical body portion and a segmental extension provided with a flat inner face, and a coacting driven wheel provided with radial slots having inner portions with which the body portion of said driving pin coacts to actuate the wheel and outer portions of a width less than the diameter of the body portion of the said pin coacting with said pin extension, said outer portions of said slots having flat outwardly diverging surfaces at the entrance thereof with which the flat face of said pin extension coacts as the pin passes into and from the slots.

6. The combination of a driving wheel provided with driving pin having a cylindrical body portion and an extension, and a coacting driven wheel provided with radially disposed slots having inner portions with which the body portion of said driving pin coacts to actuate the wheel and outer portions with which said pin extension coacts having surfaces with which the pin extension engages while the driven wheel is at rest as the pin passes into and from the slots, said driven wheel having concave surfaces between its said slots, said driving wheel having a cylindrical cam coacting with said concave surfaces of said driven wheel with a recess therein at the pin, permitting the actuation of the driven wheel by the pin.

7. The combination of a driving wheel provided with driving pin having a cylindrical body portion and an extension, and a coacting driven wheel provided with radially disposed slots having inner portions with which the body portion of said driving pin coacts to actuate the wheel and outer portions with which said pin extension coacts having surfaces with which the pin extension engages while the driven wheel is at rest as the pin passes into and from the slots.

In witness whereof, I have hereunto set my hand and seal in the presence of two witnesses.

RALPH P. DE VAULT. [L. S.]

Witnesses:
J. CLARK RIGGS,
G. C. TENNEY.